(12) United States Patent
Miller et al.

(10) Patent No.: US 6,685,855 B1
(45) Date of Patent: Feb. 3, 2004

(54) METHOD OF MAKING THERMALLY-CONDUCTIVE CASINGS FOR OPTICAL HEADS IN OPTICAL DISC PLAYERS

(75) Inventors: James Miller, Marietta, GA (US); Kevin McCullough, North Kingstown, RI (US); E. Mikhail Sagal, Wakefield, RI (US)

(73) Assignee: Cool Options, Inc., Warwick, RI (US)

( * ) Notice: Subject to any disclaimer, the term of this patent is extended or adjusted under 35 U.S.C. 154(b) by 0 days.

(21) Appl. No.: 10/459,312

(22) Filed: Jun. 11, 2003

(51) Int. Cl.[7] .......................... B29D 11/00; B29C 45/00
(52) U.S. Cl. .................................. 264/1.1; 264/328.18
(58) Field of Search .............................. 264/1.1, 1.33, 264/104, 105, 328.18; 425/810

(56) References Cited

U.S. PATENT DOCUMENTS 6,048,919 A * 4/2000 McCullough
6,162,849 A * 12/2000 Zhuo et al.

* cited by examiner

*Primary Examiner*—Mathieu D. Vargot
(74) *Attorney, Agent, or Firm*—Barlow, Josephs & Holmes, Ltd.

(57) ABSTRACT

A method of making a thermally-conductive casing for an optical head in a disc player is provided. The method involves molding a polymer composition comprising: i) about 20% to about 80% by weight of a polymer matrix such as polyphenylene sulfide, and ii) about 20% to about 80% by weight of a thermally-conductive material such as carbon graphite into a casing for the optical head. A reinforcing material, such as glass, and other additives, such as flame retardants, can be incorporated into the polymer composition.

5 Claims, 3 Drawing Sheets

METHOD OF MAKING THERMALLY-CONDUCTIVE CASINGS FOR OPTICAL HEADS IN OPTICAL DISC PLAYERS

BACKGROUND OF THE INVENTION

The present invention relates generally to optical head devices used in disc players and to methods for making thermally-conductive casings or covers for such optical heads. Particularly, the casings for the optical heads are made from polymer compositions comprising a base polymer matrix and a thermally-conductive material.

Today, optical recording media, such as compact discs (CDs) and digital video discs (DVDs), are widely used to record and playback information including music, photos, movies, and the like. In general, the surface of an optical disc contains minute recesses or pits corresponding to the recorded information. An optical head device reads the information on the optical disc, and the information is played back accordingly.

In general, the optical head device emits a laser light beam, directs and focuses the light beam onto the optical disc so as to generate reflected light from the disc, and guides the reflected light to photodetectors. The amount of reflected light generated by the optical disc changes due to the varying depths and structures of the minute pits on the surface of the disc. The recorded information on the optical disc is played back in accordance with the changes in reflected light from the disc.

Conventional optical head devices comprise various optical components that are assembled within a hard casing or covering. Typically, the components include a semiconductor laser for generating a laser light beam, an objective lens for focusing the laser beam onto the optical disc, and a focus/track signal detection element for maintaining the light beam in correct focus so that there are no tracking errors. The optical head includes various other lenses, mirrors, filtering prisms, photodetector elements, and the like. The industry continues to develop new optical head designs.

For example, Mitsumori et al., U.S. Pat. No. 5,005,162 discloses an optical head device for use in a disc player comprising a movable optical assembly in which an objective lens, first and second mirrors, and a light beam-generating/detecting unit are supported in common by a supporting member.

Lee et al., U.S. Pat. No. 6,078,555 discloses different optical head assemblies having compatibility -with a recordable compact disc (CD-R) and a digital video disc (DVD). The Pat.discloses a conventional assembly containing a first light source for emitting a first light beam having a wavelength of 635 nm for recording and reproducing information with respect to a DVD. The assembly also includes a second light source for emitting a second light beam having a wavelength of 780 nm for recording and reproducing information with respect to a CD-R. The Patent further describes an optical head assembly having a stationary first optical unit and a movable second optical unit. The second optical unit moves at a high speed on a guide rail which is installed along the diameter direction of the DVD or CD-R. The first optical unit emits a first light beam to the second optical unit and detects information from the first light beam reflected from the loaded optical disc and received by the second optical unit. The second optical unit focuses the first light beam and can generate a second light beam on the loaded optical disc depending on the type of optical disc (DVD or CD-R).

Shiono et al., U.S. Pat. No. 6,487,016 discloses a method for making a thinner optical head. The optical head comprises a light path alteration member, a first grating element, and a second grating element arranged in a light path between a light source and an optical disc.

The optical heads can generate a substantial amount of heat during operation, and the heat must be removed in order for the device to function properly. The industry has attempted to address this problem in a variety of ways.

Nagano, U.S. Pat. No. 5,680,385 discloses an optical head comprising a laser diode chip; a lens which focuses emitted light on an optical disc; a diffraction element which diffracts reflected light from the optical disc; and light detecting portions which convert the diffracted lights into electrical signals. The laser diode is fixed to a heat sink. The Patent discloses that the heat sink can be made of a semiconductor such as silicon, orientation-selective (anisotropic) etching, casted metal, or ceramic.

In other instances, the components of the optical head are contained within a metallic casing which dissipates the heat. The casing can be made from aluminum, copper, zinc, and other metals. For instance, a sheet of aluminum can be milled or cast into a desired shape for the casing. Although a metallic casing can dissipate a substantial amount of heat, it has several drawbacks. The metallic casing tends to have a heavy weight. Further, the process for manufacturing a metallic casing can be time-consuming and costly. Also, it can be cumbersome to produce casings having complex shapes using metal stamping, casting, or milling processes.

It is also common to make optical head casings using conventional plastic compositions. These known plastic compositions have some benefits. For example, the plastics can be injection-molded to produce the optical head casing. Plastic casings tend to have a lightweight construction. However, these traditional plastic casings have generally poor thermal conductive properties. Thus, metal heat spreaders or other similar parts must be installed for transferring and dissipating the heat. The addition of metallic parts to the optical head assembly adds an additional step to the manufacturing of the head and can be costly.

In view of the foregoing problems, it would be desirable to have a method for making a thermally-conductive, plastic casing for an optical head, wherein the casing has sufficient thermal conductivity, and it is not necessary to add metal heat spreaders or other heat management parts to the assembly. The present invention provides such a method.

SUMMARY OF THE INVENTION

This invention relates to relates to a method for making a molded casing or covering for an optical head device using thermally-conductive polymer compositions. The optical head device, having a thermally-conductive casing in accordance with the present invention, can be used in optical disc players such as CD and/or DVD players.

The thermally-conductive polymer composition comprises: a) 20% to 80% by weight of a polymer matrix, and b) 20% to 80% by weight of a thermally-conductive, filler material. The polymer composition may further comprise 3% to 50% by weight of a reinforcing material. The polymer matrix can be a thermoplastic or thermosetting polymer. For example, polyphenylene sulfide can be used to form the polymer matrix. The thermally-conductive, filler can be a metal, metal oxide, ceramic, carbon or other suitable material. For example, the thermally-conductive filler can be selected from the group consisting of aluminum, copper, magnesium, brass, alumina, silicon oxide, boron nitride, silicon nitride, carbon black, or carbon graphite. The reinforcing material can be glass, inorganic minerals, or other suitable mechanical strengthening agent. The polymer composition may further contain additives such as, for example, flame retardants, antioxidants, plasticizers, dispersing aids, and mold-releasing agents.

A molten polymer composition is provided, and the composition is injected into a mold. The composition is then removed from the mold to form a net-shape molded, thermally-conductive casing for an optical head device.

Preferably, the shaped article (casing) has a thermal conductivity of greater than 3 W/m° K., and more preferably greater than 22 W/m° K.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
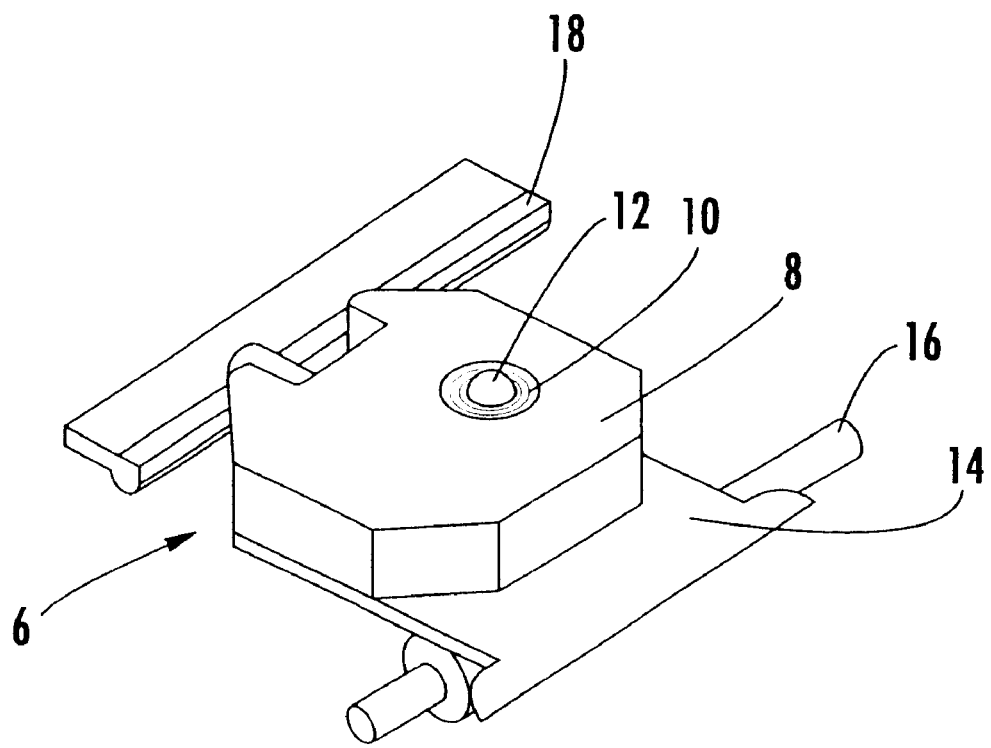
FIG. 1 is a top perspective view of one embodiment of a casing for an optical head device made with the thermally-conductive polymer composition of the present invention.

The present invention relates to methods for making casings or covers for optical heads in disc players. The casings are made using polymer compositions having high thermal conductivity. The polymer composition comprises a polymer matrix and thermally-conductive filler material.

A thermoplastic polymer selected from the group consisting of polycarbonates, polyethylene, polypropylene, acrylics, vinyls, fluorocarbons, polyamides, polyesters, polyphenylene sulfide, and liquid crystal polymers such as thermoplastic aromatic polyesters can be used to form the matrix. Polyphenylene sulfide is a particularly preferred thermoplastic polymer. Alternatively, thermosetting polymers such as elastomers, epoxies, polyimides, and acrylonitriles can be used. Suitable elastomers include, for example, styrene-butadiene copolymer, polychloroprene, nitrile rubber, butyl rubber, polysulfide rubber, ethylene-propylene terpolymers, polysiloxanes (silicones), and polyurethanes. Generally, the polymer matrix comprises about 20 to about 80% by weight of the total composition and more particularly about 40 to about 80% by weight of the composition.

In the present invention, thermally-conductive filler materials are added to the polymer matrix. These materials impart thermal conductivity to the non-conductive polymeric matrix. Suitable filler materials include, for example, metals such as graphite, aluminum, copper, silver, nickel, magnesium, and brass; metal oxides such as alumina, magnesium oxide, zinc oxide, and titanium oxide; ceramics such as silicon nitride, aluminum nitride, boron nitride, boron carbide; and carbon materials such as carbon black or graphite. Mixtures of such fillers are also suitable. Generally, the thermally-conductive fillers comprise about 20 to about 80% by weight of the total composition and more particularly about 30 to about 60% by weight of the composition. Graphite is a particularly preferred thermally-conductive filler material for use in the present invention. In one preferred embodiment, the composition comprises about 40% by weight of graphite and about 60% by weight of polyphenylene sulfide.

The filler material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size in the range of 0.5 to 300 microns. In some instances, the filler material can have a relatively high aspect (length to thickness) ratio of about 10:1 or greater. For example, PITCH-based carbon fiber having an aspect ratio of about 50:1 can be used. Alternatively, the filler material can have a relatively low aspect ratio of about 5:1 or less. For example, boron nitride grains having an aspect ratio of about 4:1 can be used. Both low aspect and high aspect ratio filler materials can be added to the polymer matrix as described in McCullough, U.S. Pat. Nos. 6,251,978 and 6,048,919, the disclosures of which are hereby incorporated by reference. Particularly, the compositions of this invention can contain about 25 to about 60% by weight of a filler having a high aspect ratio of about 10:1 or greater, and about 10 to about 25% by weight of a filler having a low aspect ratio of about 5:1 or less.

An optional reinforcing material can be added to the polymer matrix. The reinforcing material can be glass, inorganic minerals, or other suitable material. The reinforcing material strengthens the polymer matrix. The reinforcing material, if added, constitutes about 3% to about 25% by weight of the composition.

The thermally-conductive, filler material and optional reinforcing material are intimately mixed with the non-conductive polymer matrix to form the polymer composition. The loading of the thermally-conductive, filler material imparts thermal conductivity to the composition. The loading of the reinforcing material enhances the mechanical strength of the composition. If desired, the mixture may contain additives such as, for example, flame retardants, antioxidants, plasticizers, dispersing aids, and mold-releasing agents. A flame retardant additive is particularly preferred. The mixture can be prepared using techniques known in the art.

The ingredients are mixed preferably under low shear conditions in order to avoid damaging the structure of the filler materials. Preferably, the polymer compositions have a thermal conductivity of greater than 3 W/m° K and more preferably greater than 22 W/m° K. These high heat conduction properties allow the finished article (optical head casing) to effectively dissipate heat from heat-generating sources contained within the casing.

The resulting composition can be shaped into the desired article using any suitable molding process such as melt-extrusion, casting, or injection-molding.

In general, injection-molding involves the steps of: (a) feeding the composition into the heating chamber of a molding machine and heating the composition to form a molten composition; b) injecting the molten composition into a mold cavity; c) maintaining the composition in the mold under high pressure until it cools; and d) removing the molded article. The molding method used to make the shaped optical head casing of the present invention has several advantageous properties.

First, the molding process produces a "net-shape molded" part. The final shape of the optical head casing is determined by the shape of the mold cavity. No further processing, die-cutting, machining, or other tooling is required to produce the final shape of the casing. In contrast, such additional machine processing is often needed for shaping metallic parts, and this processing can be costly and time-consuming. In addition, polymer materials are often lighter and less costly than metallic parts.

Further, the casing has good heat conduction properties so that it can effectively remove heat generated by the enclosed components. Preferably, the casing has a thermal conductivity of greater than 3 W/m° K, and more preferably it is greater than 22 W/m° K.

The casings can have various designs and structures depending on the type of optical head unit and the components of the optical head assembly enclosed within the casing. For example, a thermally-conductive casing having the design shown in FIG. 1 can be made in accordance with this invention. In FIG. 1, the optical head unit is generally indicated at 6, and the thermally-conductive casing for the optical head unit is generally indicated at 8. The casing 8 includes an opening 10 to which an objective lens 12 faces. The casing 8 can be mounted on a movable base member 14 which engages guide members 16 and 18 provided within the disc player (not shown). It is understood that the optical head unit 6 shown in FIG. 1 is for illustration purposes only. Optical head units having other structures may be made in accordance with the present invention.

Figure 2:
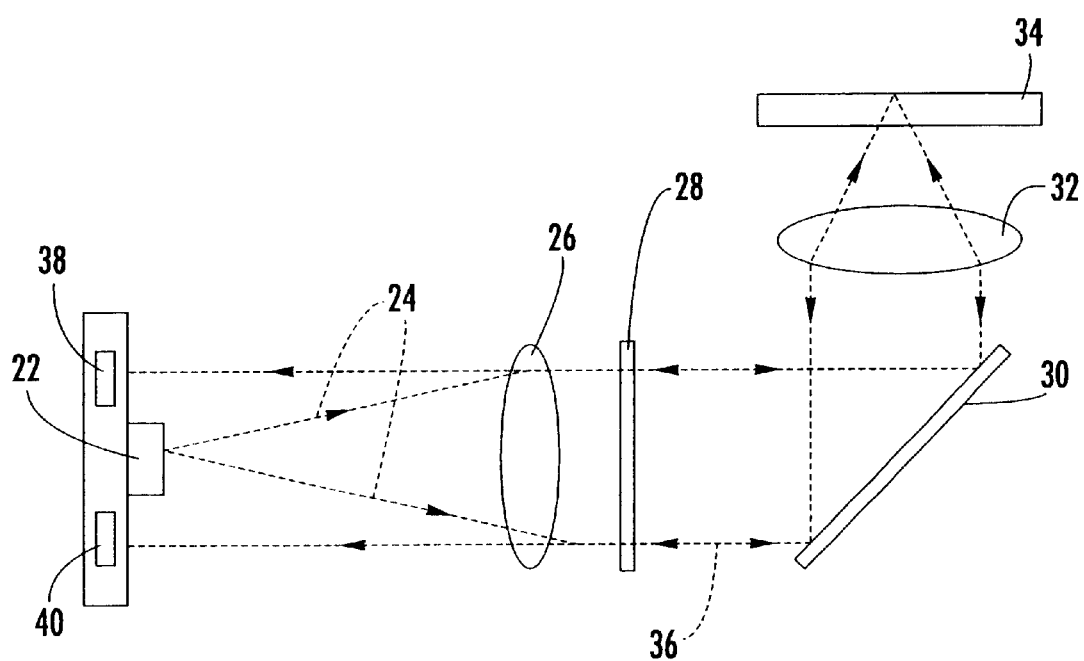
FIG. 2 is a side perspective view of the components of a conventional optical head device.

The optical head unit 6 may contain many conventional optical components which are assembled in a specific layout as shown in FIG. 2. In FIG. 2, a semiconductor laser 22 of an optical head is shown emitting a laser light beam 24. A collimator lens 26 collimates the light beam 24 into parallel light. The light beam 24 passes through a focus/track error signal detection element 28 and is deflected by a mirror 30. The deflected light beam 24 is directed to an objective lens 32 which condenses and focuses the beam 24 on an optical disc 34. The light beam 24 is reflected off the optical disc 34 and returns on the same light path. In the return light path, the objective lens 32 turns the reflected light 36 into parallel light, and the light 36 is deflected by the mirror 30 and enters the focus/track error signal detection element 28. Then, the light 36 is transmitted to photodetectors 38 and 40 which detect the information from the light beams and converts the light into electrical signals.

Figure 3:
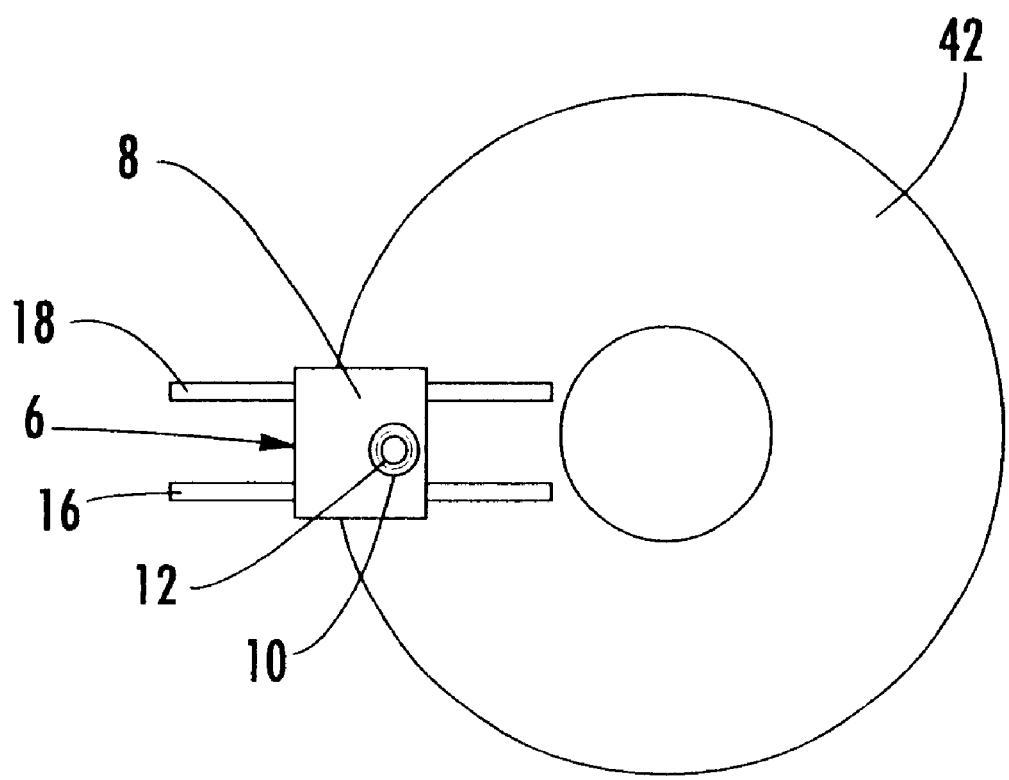
FIG. 3 is a top perspective view showing an optical head device reading an optical disc, wherein the optical head has a thermally-conductive casing made in accordance with the present invention.

The thermally-conductive casings of the present invention can be used to enclose optical head units having various designs and configurations. For example, in FIG. 3, the optical head unit 6 comprising thermally-conductive casing 8 is installed along guide rails 16 and 18 within the optical disc player (not shown). The optical head unit 6 can move along guide rails 16 and 18 and focus a laser light beam onto the surface of optical disc 42 (for example, a DVD or CD) to play back the information recorded on the surface of the disc 42.

In accordance with the present invention, thermally-conductive casings for optical head devices are provided. The thermally-conductive casings effectively dissipate heat generated by the components contained within the optical head. The built-up heat is removed from the optical head so that the head can function properly within a disc player.

It is appreciated by those skilled in the art that various changes and modifications can be made to the illustrated embodiments herein without departing from the spirit of the invention. All such modifications and changes are intended to be covered by the appended claims.

What is claimed is:

1. A method of making a net-shape molded, thermally-conductive casing for an optical head device in disc players, comprising the steps of:

a) providing a molten polymer composition comprising i) about 20% to about 80% by weight of polyphenylene sulfide, and ii) about 40% by weight of thermally-conductive, carbon graphite;

b) injecting the molten composition into a mold;

c) removing the composition from the mold to form a net-shape molded, thermally-conductive casing for an optical head device, said casing having a thermal conductivity of greater than 3 W/m° K.

2. The method of claim 1, wherein the polymer composition further comprises a reinforcing material.

3. The method of claim 2, wherein the reinforcing material is glass.

4. The method of claim 1, wherein the polymer composition comprises about 60% by weight of polyphenylene sulfide and about 40% by weight of graphite.

5. The method of claim 1, wherein the polymer composition further comprises an additive selected from the group consisting of flame retardants, antioxidants, plasticizers, dispersing aids, and mold-releasing agents.

* * * * *